No. 796,474. PATENTED AUG. 8, 1905.
L. A. TIRRILL.
MOTOR CONTROL SYSTEM AND SWITCH THEREFOR.
APPLICATION FILED APR. 15, 1903.

2 SHEETS—SHEET 2.

Witnesses:

Inventor,
Leonard A. Tirrill
By
Att'y.

UNITED STATES PATENT OFFICE.

LEONARD A. TIRRILL, OF LYNN, MASSACHUSETTS, ASSIGNOR TO GENERAL ELECTRIC COMPANY, A CORPORATION OF NEW YORK.

MOTOR-CONTROL SYSTEM AND SWITCH THEREFOR.

No. 796,474. Specification of Letters Patent. Patented Aug. 8, 1905.

Application filed April 15, 1903. Serial No. 152,684.

*To all whom it may concern:*

Be it known that I, LEONARD A. TIRRILL, a citizen of the United States, residing at Lynn, county of Essex, State of Massachusetts, have invented certain new and useful Improvements in Motor - Control Systems and Switches Therefor, of which the following is a specification.

My invention relates to improvements in a system of motor control in which a motor is manually cut into circuit and after performing a certain definite work is automatically cut out.

It comprises a novel form of double-throw switch, which is manually thrown into either connecting position and held in such position by electrically-actuated means until the motor has completed its work.

It also comprises, in combination with said switch, a novel arrangement of circuits and auxiliary apparatus, as well as other details hereinafter described, and particularly pointed out in the appended claims.

In the embodiment of my invention disclosed in this application a shunt-wound motor is employed in connection with suitable switching mechanism to raise or lower a theater-curtain, which at the limit of its movement in either direction is adapted to open an auxiliary circuit to allow the switch mechanism to return to open position.

Figure 1:
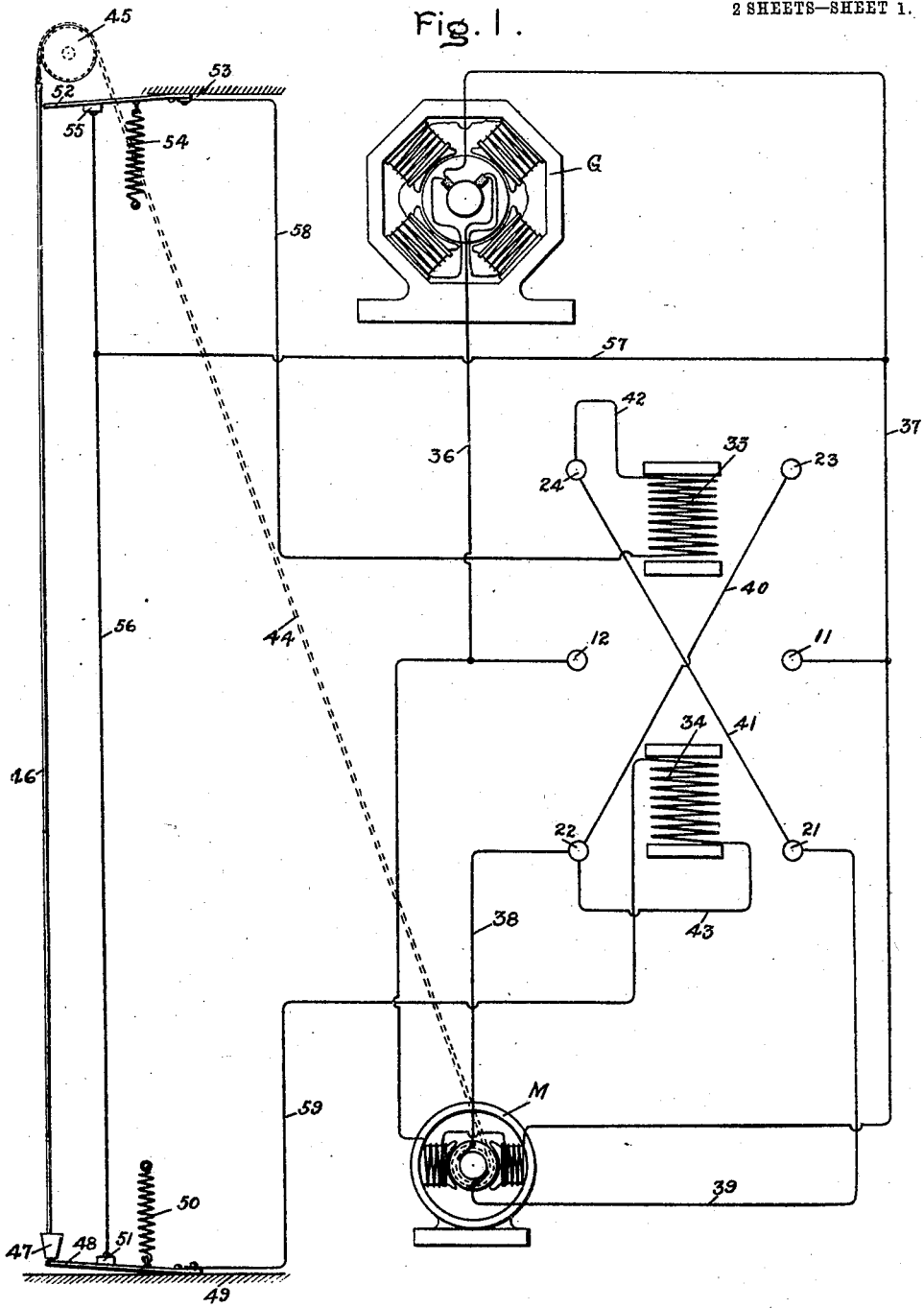
Figure 2:
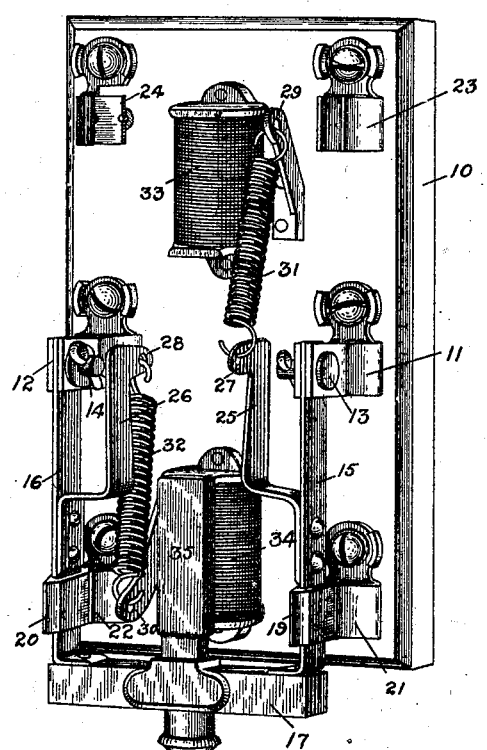
Figure 3:
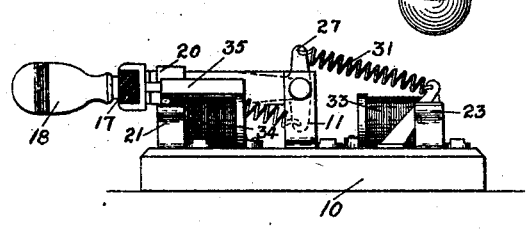
Figure 4:
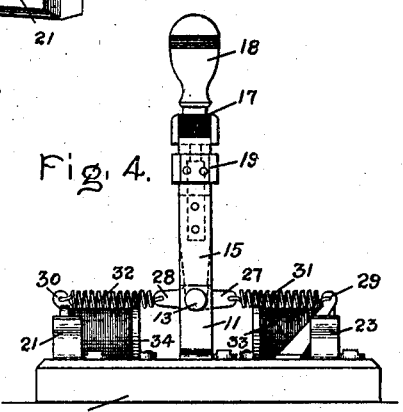

In the accompanying drawings, which are to be considered a part of this specification, Figure 1 is a diagrammatic view of the aforesaid embodiment of my invention. Fig. 2 is a perspective view of the switch mechanism. Fig. 3 is a side view of such mechanism with a portion of one of the switch-blades broken away, and Fig. 4 is a side view of said switch mechanism with its parts in normal position.

Referring particularly to the switch, 10 designates a base upon which are mounted suitable supports 11 12, to which are pivoted by pivots 13 14 blades 15 16, which extend in a direction parallel to each other and which are connected at their unpivoted ends by an insulating-piece 17, provided with a suitable handle 18. The blades 15 16 carry double wedge-shaped contacts 19 20, which are adapted to engage with suitable contact-clips 21, 22, 23, and 24, located at the four corners of the base 10.

The portion of the switch which I have thus far described is a double-pole switch of a well-known type.

Upon the blades 15 and 16 are rigidly-supported arms 25 26, which extend out from said blades toward each other and thence in the direction of the blades toward their pivoted ends, terminating in oppositely-extending projections 27 and 28. These projections are suitably apertured. Toward the ends of the base 10, in line with the arms 25 and 26, are abutments 29 30, suitably secured to said base and provided with apertures at their upper ends. The coiled springs 31 and 32 pass through the apertures in the projection 27 of the arm 25 and the abutment 29, and a similar coiled spring 32 connects the projection 28 of the arm 26 and the abutment 30. These springs are under tension and tend to lie in line with each other, and by reason of the bell-crank projections 27 and 28 thereby hold the switch member, comprising the blades 15 and 16, in an intermediate position at right angles to the plane of the base, as illustrated in Fig. 4. This pivoted member may, however, be thrown against the tension of the springs in one direction into contact with the contacts 20 and 21, as shown in Fig. 3, or in the opposite direction into contact with the contacts 23 and 24. In order to hold the movable switch member in either of its closed positions against the action of the springs, I have provided electrically-actuated means comprising electromagnets 33 34, secured to the base 10 adjacent to the abutments 29 and 30. The poles of each of these magnets lie in a plane parallel to the plane of the base and midway between the switch-blades 15 16. Mounted on the cross-piece 17 of the movable switch member is an armature 35, which is adapted to engage with the poles of the magnets 33 and 34 when the switch is moved into either of its contacting positions. This switch is diagrammatically shown in Fig. 1, together with its connections. In said diagram, M designates a shunt-wound motor whose field-coils are connected directly with supply-wires 36 and 37, extending from the generator G. The brushes of this motor are connected by wires 38 and 39 with the switch-contacts 22 and 21, respectively. Contact 22 is electrically connected with the contact 23 by the wire 40, and the contact 21 is similarly connected by the wire 41 with the contact 24. The pivotal supports 11 and 12 of the switch are suitably connected to the supply-wires 36 and 37, respectively. These connections constitute the principal motor connections. One terminal of the coil of the magnet 33 is connected by the wire 42 with the switch-contact 24, and one of the terminals of the coil of the magnet 34 is connected by the wire 43 with the switch-contact 22. The motor is adapted to drive a hoisting-drum so as to wind up a cable 44, which passes over a pulley 45 to raise a curtain 46. This curtain is provided at its lower end with a weight 47, which is adapted to engage a switch-arm 48, connected to the floor 49, and disengage it from the fixed contact 51. A spring 50 serves to bring the switch-arm 48 into its normal or engaging position. Adjacent to the pulley 45 is a similar yielding switch-arm 52, mounted upon a suitable support 53 and adapted to be drawn by spring 54 into engagement with a fixed contact 55. The contacts 51 and 55 are directly connected by a wire 56, which is connected by lead 57 with the supply-wire 37. The switch-arm 52 is connected by a wire 58 with the unconnected terminal of the coil of the magnet 33. Similarly, switch-arm 48 is connected by wire 59 with the unconnected terminal of the coil of the magnet 34.

In the operation of my system the switch-blades 15 16, with their accompanying contacts 19 20, are normally held, as illustrated in Fig. 4, out of contact with any of the fixed switch-contacts, and therefore the armature-circuit is open. The switch may be thrown manually, so as to bring its contacts 19 and 20 into engagement with the contacts 23 and 24 to drive the motor in one direction or into engagement with the contacts 21 and 22 to drive it in the opposite direction, and when so thrown it is there retained in contact by the action of the adjacent magnet upon the armature 35. For instance, if the switch-handle 18 is thrown so as to bring the contacts 19 20 into engagement with the contacts 21 22 the magnet 34 is energized by current passing from the supply-wire 36 through pivotal support 12, blade 16, contact 22, wire 43, magnet-coil 34, wire 59, switch-arm 48, contact 51, wires 56 57, to return supply-wire 37. The switch is therefore held in this closed position, and the motor is consequently driven until the coil of the magnet 34 is deënergized, which will occur when the circuit embracing said coil is opened at the point 48 51 by the curtain-weight 47 engaging the switch-arm 48. As soon as this circuit is broken the springs 31 32 return the movable switch-contacts to inoperative position. In a similar manner when the switch-handle is thrown in the opposite direction the coil 33 is energized through a similar circuit embracing the switch-contacts 52 55 and the connecting-wires 57 58. When the switch is in this position, the motor is driven in a direction to raise the curtain which breaks the circuit, including the coil of the magnet 33, at the point 52 55 by contact of the weight 47 with the switch-arm 52.

Many modifications and alterations may be made in the system and its various elements herein described without departing from the spirit of my invention, and I therefore do not desire to be limited to the specific matter disclosed.

What I claim as new, and desire to secure by Letters Patent of the United States, is—

1. The combination of a source of supply, a motor suitably connected in circuit therewith, a switch in said circuit operable to connect the motor for rotation in either direction, electrically-actuated means included in circuit with said switch for holding said switch in either of said operative positions, means for returning said switch to open position when the holding means is rendered inoperative, and means operated by said motor to render he holding means inoperative.

2. The combination of a source of supply, a motor suitably connected in circuit therewith, a switch in said circuit operable to connect the motor for rotation in either direction, electrically-actuated means included in circuit with said switch for holding said switch in either of said operative positions, a secondary switch located in circuit with each electrically-actuated holding means and adapted to open the circuit through said means, and means for returning the switch to open position when the circuit through the holding means is opened.

3. The combination of a source of supply, a motor suitably connected in circuit therewith, a switch in said circuit operable to connect the motor for rotation in either direction, electrically-actuated means included in circuit with said switch for holding said switch in either of said operative positions, a secondary switch in circuit with each holding means, means responsive to the operation of the motor to actuate one of the secondary switches and thereby deënergize that holding means which holds the switch in operative position, and means to restore the switch to open position when said secondary switch is operated.

4. The combination of a source of supply, a motor suitably connected in circuit therewith, a switch in said circuit operable to connect the motor for rotation in either direction, electromagnets included in circuit with said switch for holding said switch in either of said operative positions, a curtain movable up and down by said motor, secondary switches located in the path of said curtain and adapted to limit its upward and downward movement, each secondary switch being included in circuit with one of said electromagnets, and means for restoring the switch to open position when the holding-magnet is deënergized by the action of said curtain upon its switch.

5. In a switching mechanism, two sets of fixed contacts, each set consisting of one or more contacts, a pivotally-mounted contact member located between said sets and adapted to engage with either set, spring mechanism for holding said member normally out of engagement with the fixed contacts, and electrically-actuated means included in circuit with said switch and located on each side of said member for holding it in engagement with the adjacent set of fixed contacts after it has been drawn into such position against the force of the spring mechanism.

6. In a switching mechanism, two sets of fixed contacts, each set consisting of one or more contacts, a pivotally-mounted contact member located between said sets and adapted to engage with either set, spring mechanism for holding said member normally out of engagement with the fixed contacts, an electromagnet on each side of said member included in circuit with said switch, means for energizing said magnets, and an armature secured to said contact member and adapted to engage either magnet whereby the contact member may be retained in contact with either set of fixed contacts.

7. In a switching mechanism, two sets of fixed contacts, each set consisting of one or more contacts, a pivotally-mounted contact member located between said sets and adapted to engage with either set, said contact member comprising two parallel conductor-blades pivoted at one end and connected together at the other by an insulating member, spring mechanism for holding said pivoted member normally out of engagement with the fixed contacts, an electromagnet at each side of said member, means for energizing said magnets, and an armature secured to said insulating member and extending parallel to the conductor-blades and adapted to engage either magnet whereby the contact member may be retained in contact with either set of fixed contacts.

8. In a switching mechanism, two sets of fixed contacts, each consisting of one or more contacts, a contact member pivoted between said sets and adapted to be moved into contact with either set, said pivoted member comprising two parallel blades pivoted at one end and secured together at the other, a projection extending from said pivoted member, a strained spring secured at one end to said projection and at the other to a suitable fixed support, the spring projection and support being so arranged that when the switch is open the point of connection between the spring and projection shall be in line with the pivot and the fixed point of support for the spring and when the switch is closed said point of connection shall be forced out of said line, and means for holding said pivoted member in contact with either set of contacts.

9. In a switching mechanism, two sets of fixed contacts, each set consisting of one or more contacts, a contact member pivoted between said sets and adapted to be moved into contact with either set, said pivoted member comprising two parallel blades pivoted at one end and secured together at the other, a projection extending from each blade, a strained spring for each blade connected at one end to the projection of that blade and connected at the other to a suitable support, said connections being so arranged that when the pivoted member is in open position the point of connection between each spring and its projection will be in line with the corresponding pivot and point of support and when in the closed position not in said line, and means for holding the pivoted member in contact with either set of fixed contacts.

10. The combination of a curtain, a weight at the lower edge thereof, a switch adapted to be operated by said curtain comprising a spring-returned arm extending into the path of said weight, and a fixed contact for engagement therewith.

11. The combination of a curtain, a weight at the lower edge thereof, switches at the upper and lower limits of its movement, each switch comprising a spring-returned arm extending into the path of said weight, and a fixed contact for engagement therewith.

In witness whereof I have hereunto set my hand this 13th day of April, 1903.

LEONARD A. TIRRILL.

Witnesses:
 DUGALD McK. McKILLOP,
 JOHN A. McMANUS.